(12) United States Patent
Takarabe

(10) Patent No.: US 11,677,887 B2
(45) Date of Patent: Jun. 13, 2023

(54) COMMUNICATION APPARATUS AND METHOD FOR CONTROLLING THE SAME

(71) Applicant: CANON KABUSHIKI KAISHA, Tokyo (JP)

(72) Inventor: Kei Takarabe, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/850,273

(22) Filed: Jun. 27, 2022

(65) Prior Publication Data

US 2022/0417380 A1 Dec. 29, 2022

(30) Foreign Application Priority Data

Jun. 29, 2021 (JP) .............................. JP2021-108168

(51) Int. Cl.
*G06F 3/12* (2006.01)
*H04N 1/00* (2006.01)

(52) U.S. Cl.
CPC ..... *H04N 1/00933* (2013.01); *H04N 1/00909* (2013.01); *H04N 1/00928* (2013.01)

(58) Field of Classification Search
CPC ........... H04N 1/00933; H04N 1/00909; H04N 1/00928
See application file for complete search history.

(56) References Cited

U.S. PATENT DOCUMENTS

| 2016/0198403 | A1* | 7/2016 | Sumiuchi | .............. | H04W 48/20 |
| | | | | | 455/434 |
| 2017/0041977 | A1* | 2/2017 | Yokoyama | ............ | H04W 76/19 |
| 2017/0223748 | A1* | 8/2017 | Sumiuchi | ................ | H04W 4/20 |
| 2017/0339698 | A1 | 11/2017 | Takarabe | | |
| 2021/0037160 | A1 | 2/2021 | Watanabe | | |

FOREIGN PATENT DOCUMENTS

JP 2015-023440 A 2/2015

OTHER PUBLICATIONS

Canon: Pixma Manuals: "Setup Guide—MG3600 Series", Dec. 1, 2020, XP55982169, pp. 1-2, Internet Retrieval on Nov. 16, 2022.

* cited by examiner

*Primary Examiner* — Moustapha Diaby
(74) *Attorney, Agent, or Firm* — Canon U.S.A., Inc. IP Division

(57) ABSTRACT

A communication apparatus includes a control unit configured to perform, in a case where the communication apparatus is operating in a connection setting mode and a predetermined process is completed, control to stop operation in the connection setting mode based on passage of a second time longer than a first time without performance of connection setting from a start of an operation of the communication apparatus in the connection setting mode.

19 Claims, 6 Drawing Sheets

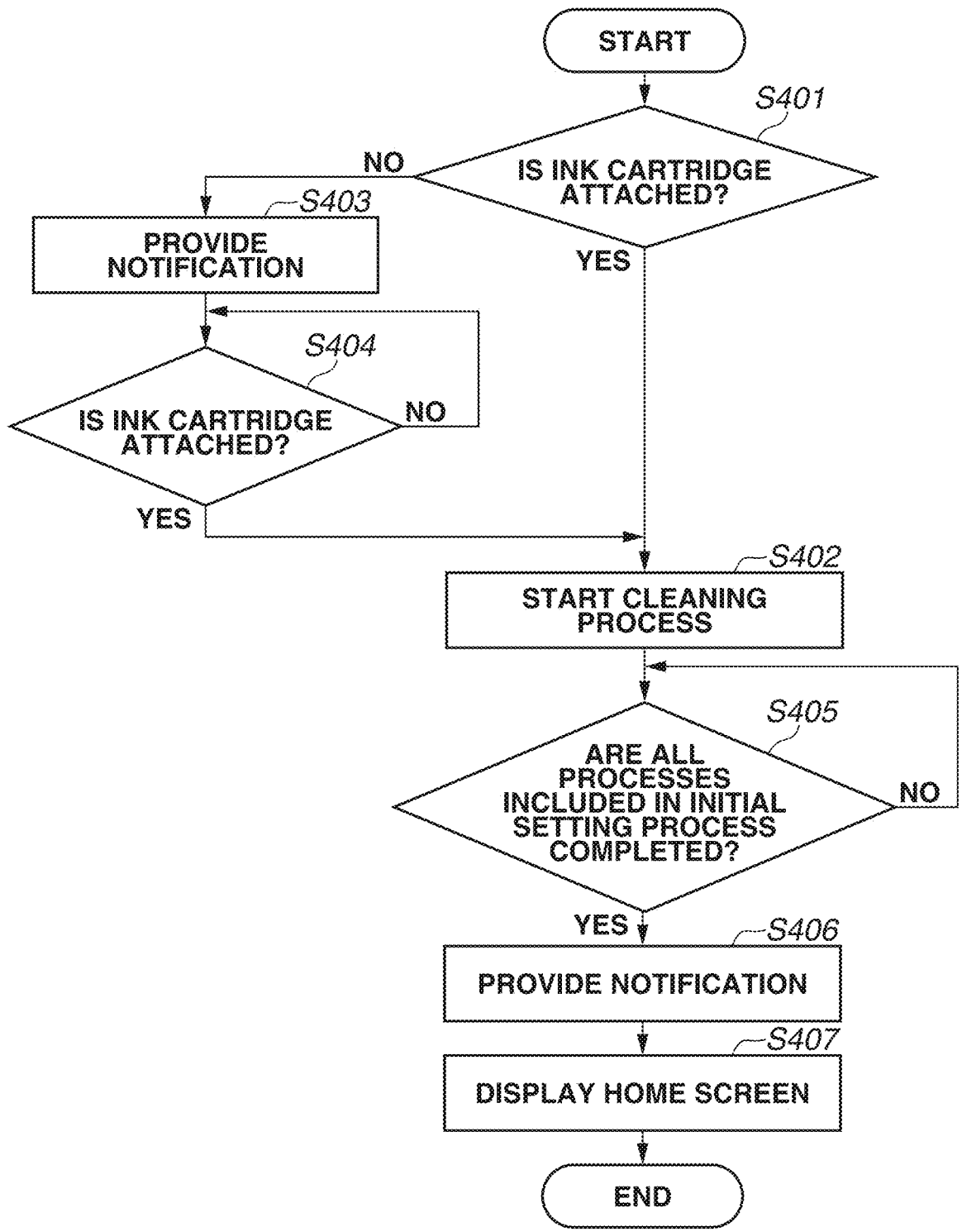

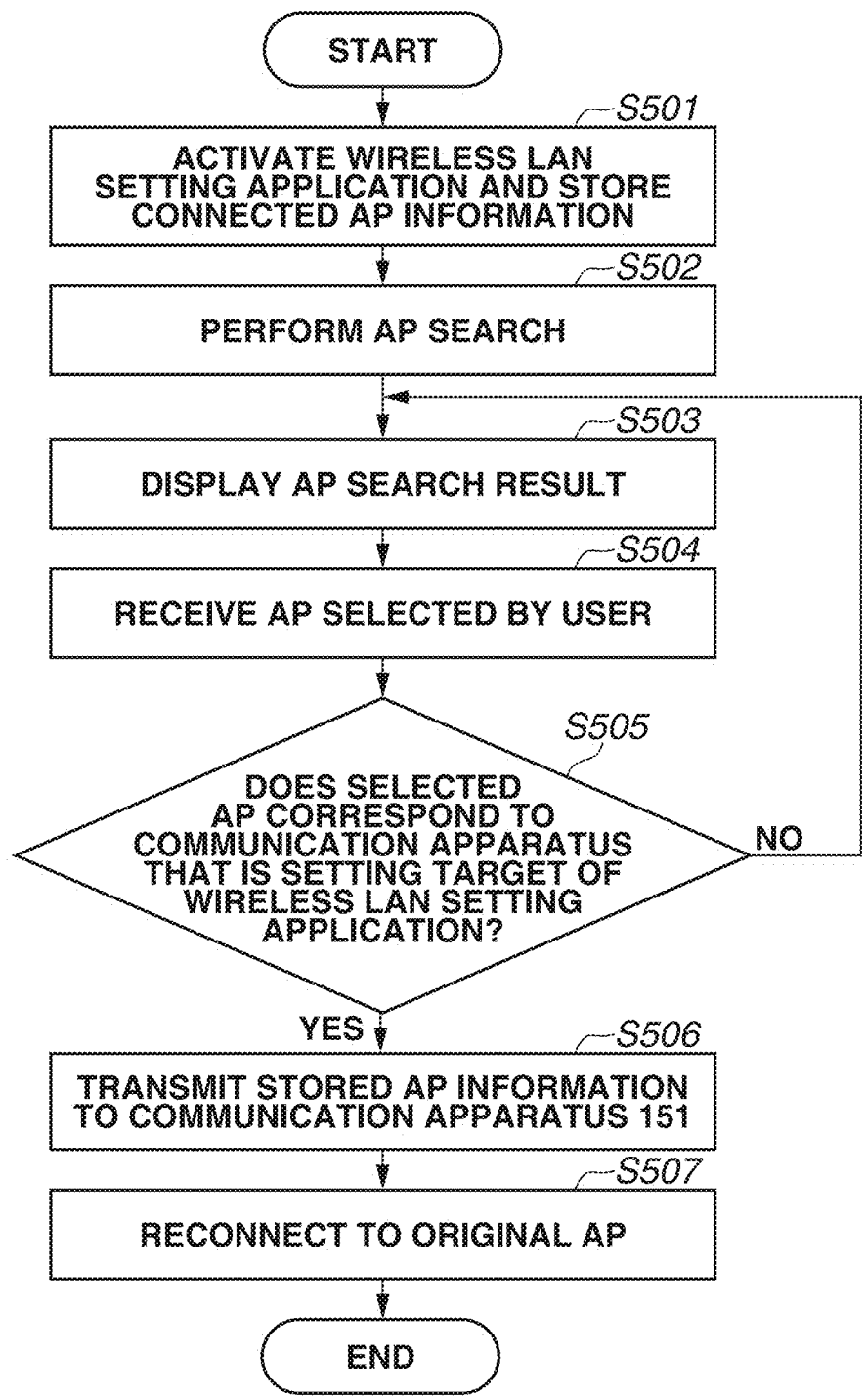

COMMUNICATION APPARATUS AND METHOD FOR CONTROLLING THE SAME

BACKGROUND OF THE INVENTION

Field of the Invention

The present invention relates to a communication apparatus and a method for controlling the same.

Description of the Related Art

Communication apparatuses, such as printers, that communicate with terminal apparatuses such as personal computers (PCs) and smartphones are known. Such communication apparatuses perform a connection setting process for communicating with a terminal apparatus using a predetermined communication method such as Wi-Fi®. In this process, the communication apparatus operates in a connection setting state (connection setting mode). The connection setting state is a state for performing the connection setting process.

Japanese Patent Application Laid-Open No. 2015-023440 discusses a communication apparatus that operates in a software access point (software AP) mode. The communication apparatus receives an apparatus information setting command and sets an operation mode based on the received command.

Japanese Patent Application Laid-Open No. 2015-023440, however, is silent on appropriate control of a timeout time of the software AP mode.

SUMMARY OF THE INVENTION

The present invention is directed to performing appropriate control for stopping an operation in a connection setting mode.

According to an aspect of the present invention, a communication apparatus includes a start unit configured to cause the communication apparatus to start operation in a connection setting mode to receive settings information from an information processing apparatus, a setting unit configured to perform connection setting of the communication apparatus based on the settings information in a case where the settings information is received from the information processing apparatus while the communication apparatus is operating in the connection setting mode, a performing unit configured to perform a predetermined process conducted based on a user operation, and a control unit configured to perform, in a case where the communication apparatus is operating in the connection setting mode and the predetermined process is not completed, first control to stop the operation in the connection setting mode based on passage of a first time without performance of the connection setting from the start of the operation of the communication apparatus in the connection setting mode, and, in a case where the communication apparatus is operating in the connection setting mode and the predetermined process is completed, second control to stop the operation in the connection setting mode based on passage of a second time longer than the first time without performance of the connection setting from the start of the operation of the communication apparatus in the connection setting mode.

Further features of the present invention will become apparent from the following description of exemplary embodiments with reference to the attached drawings.

BRIEF DESCRIPTION OF THE DRAWINGS

FIG. 4 is an initial setting process that is performed by a communication apparatus according to an exemplary embodiment of the present invention.

FIG. 5 is a flowchart illustrating a process that is performed by an information processing apparatus for causing a communication apparatus to perform a connection setting process according to an exemplary embodiment of the present invention.

DESCRIPTION OF THE EMBODIMENTS

Various exemplary embodiments of the present invention will be described below with reference to the drawings. It should be understood that changes and modifications that are appropriately made to the below-described exemplary embodiments without departing from the spirit of the invention based on ordinary knowledge of those skilled in the art are also encompassed within the scope of the invention.

An information processing apparatus of a communication system and a communication apparatus according to a first exemplary embodiment will now be described. While a smartphone will be described below as an example of an information processing apparatus according to the present exemplary embodiment, the information processing apparatuses are not limited to smartphones, and various information processing apparatuses, such as mobile terminals, laptop personal computers (laptop PCs), tablet terminals, personal digital assistants (PDAs), and digital cameras, are also applicable. Further, while a printer will be described below as an example of a communication apparatus according to the present exemplary embodiment, the communication apparatuses are not limited to printers, and various communication apparatuses capable of wirelessly communicating with an information processing apparatus are also applicable. For example, printers such as inkjet printers, full-color laser beam printers, and monochrome printers are applicable. Further, not only printers but also copy machines, facsimile apparatuses, mobile terminals, smartphones, laptop PCs, tablet terminals, PDAs, digital cameras, music reproduction devices, televisions, and smart speakers are also applicable. Besides those described above, multifunction peripherals with a plurality of functions such as copy, facsimile, and print functions are also applicable.

Figure 1:
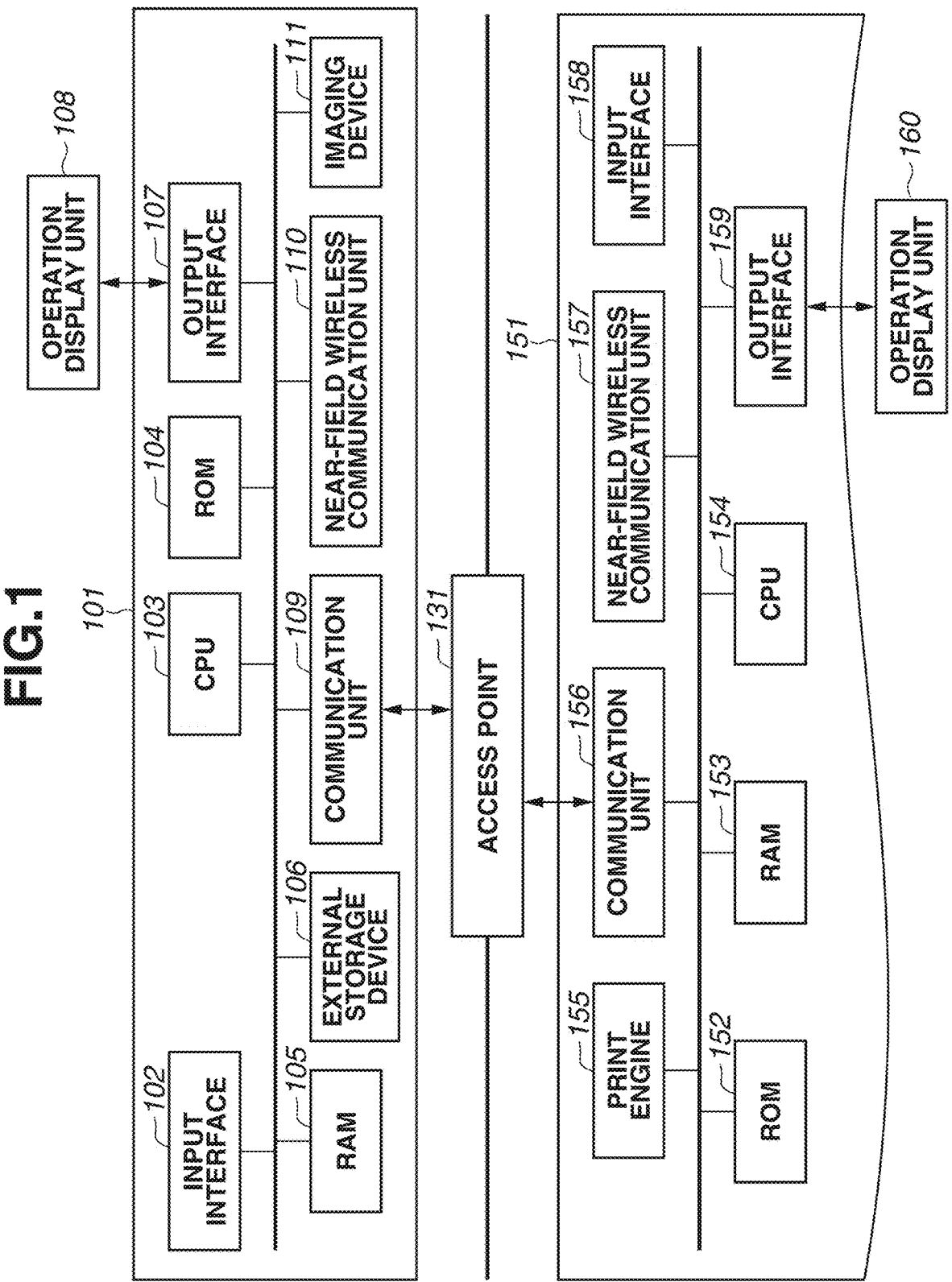
FIG. 1 is a diagram illustrating a configuration of an information processing apparatus and a communication apparatus included in a communication system according to an exemplary embodiment of the present invention.

A configuration of an information processing apparatus and a communication apparatus capable of communicating with the information processing apparatus included in a communication system according to the present exemplary embodiment will be described with reference to a block diagram illustrated in FIG. 1. Further, while the following configurations according to the present exemplary embodiment are described as an example, functions are not to be limited to those illustrated in FIG. 1.

An information processing apparatus 101 includes an input interface 102, a central processing unit (CPU) 103, a read-only memory (ROM) 104, a random access memory (RAM) 105, an external storage device 106, an output interface 107, an operation display unit 108, a communication unit 109, a near-field wireless communication unit 110, and an imaging device 111.

The input interface 102 is an interface for receiving data input and operation instructions from a user and includes a physical keyboard, a button, and/or a touch panel. The output interface 107 and the input interface 102 can be integrated into a single component that outputs screens and receives operations from the user.

The CPU 103 is a system control unit and controls the entire information processing apparatus 101.

The ROM 104 stores fixed data to be performed by the CPU 103, such as control programs, data tables, and embedded operating system (embedded OS) programs. According to the present exemplary embodiment, each control program stored in the ROM 104 performs software execution control, such as scheduling, task switching, and interrupting processing, under management of an embedded OS stored in the ROM 104.

The RAM 105 includes a static RAM (SRAM) that needs backup power. Since data is retained by a primary battery (not illustrated) for data backup, the RAM 105 stores important data, such as program control variable numbers, without volatilizing the data. The RAM 105 also includes a memory area for storing settings information about the information processing apparatus 101 and management data of the information processing apparatus 101. The RAM 105 is also used as a main memory and a work memory of the CPU 103.

The external storage device 106 stores an application (hereinafter, referred to as "print application") that provides a print execution function. The external storage device 106 also stores various programs, such as a print information generation program for generating print information interpretable by a communication apparatus 151 and an information transmission/reception control program for transmitting and receiving information to and from the communication apparatus 151 connected via the communication unit 109. The external storage device 106 stores various types of information for use by the programs. The external storage device 106 also stores image data acquired from other information processing apparatuses or the Internet via the communication unit 109.

The output interface 107 is an interface for the operation display unit 108 to control data display and provision of notifications of states of the information processing apparatus 101.

The operation display unit 108 includes a light emitting diode (LED) and a liquid crystal display (LCD). The operation display unit 108 displays data and provides notifications of states of the information processing apparatus 101. A software keyboard may receive input from the user via the operation display unit 108 by having keys, such as a numeric value input key, a mode setting key, a set key, a cancel key, and a power key, on the operation display unit 108.

The communication unit 109 is a component for connecting to an apparatus, such as the communication apparatus 151, and performing data communication. For example, the communication unit 109 can connect to an internal access point (not illustrated) of the communication apparatus 151. The communication unit 109 and the internal access point of the communication apparatus 151 connect to each other to enable communication between the information processing apparatus 101 and the communication apparatus 151. The communication unit 109 can directly communicate with the communication apparatus 151 via wireless communication or can communicate with the communication apparatus 151 via an access point 131 situated outside the information processing apparatus 101 and the communication apparatus 151.

Examples of wireless communication methods include the Institute of Electrical and Electronics Engineers (IEEE) 802.11 series communication standards and Bluetooth®. The IEEE 802.11 series communication standards are Wi-Fi®. The access point 131 is a device such as a wireless local area network (wireless LAN) router. According to the present exemplary embodiment, a method by which the information processing apparatus 101 and the communication apparatus 151 connect directly to each other without using an external access point is referred to as "direct connection method". Further, a method by which the information processing apparatus 101 and the communication apparatus 151 connect to each other via the external access point 131 will be referred to as "infrastructure connection method".

The near-field wireless communication unit 110 is a component for establishing a near-field wireless connection with an apparatus, such as the communication apparatus 151, and performing data communication. The near-field wireless communication unit 110 performs communication using a communication method different from those used by the communication unit 109. The near-field wireless communication unit 110 can connect to a near-field wireless communication unit 157 within the communication apparatus 151.

The imaging device 111 is a device that converts images captured by an image sensor into digital data. The digital data is first stored in the RAM 105. Thereafter, the digital data is converted into a predetermined image format by a program executed by a CPU 154, and the converted digital data is stored as image data in the external storage device 106.

A ROM 152 stores fixed data, such as control programs to be executed by the CPU 154, data tables, and OS programs.

The communication apparatus 151 includes the ROM 152, a RAM 153, the CPU 154, a print engine 155, a communication unit 156, the near-field wireless communication unit 157, an input interface 158, an output interface 159, and an operation display unit 160. A connection mode (communication mode) is set for the communication apparatus 151, so that the communication apparatus 151 can operate in the set connection mode.

The communication unit 156 is a component via which the communication apparatus 151 communicates with another apparatus. According to the present exemplary embodiment, the communication unit 156 performs communication complying with the IEEE 802.11 series communication standards. The communication unit 156 includes an access point for connecting to an apparatus, such as the information processing apparatus 101, as the internal access point of the communication apparatus 151. This access point is connectable to the communication unit 109 of the information processing apparatus 101. The communication unit 156 can directly communicate with the information processing apparatus 101 via wireless communication or can communicate with the information processing apparatus 101 via the access point 131. Further, the communication unit 156 can include hardware that functions as an access point, or operate as an access point by using software for functioning as an access point.

The RAM 153 includes a dynamic RAM (DRAM) that needs backup power. Since data is retained by a power source (not illustrated) for data backup, the RAM 153 stores important data, such as program control variable numbers, without volatilizing the data. The RAM 153 is also used as a main memory and a work memory of the CPU 154 and stores various types of information and a reception buffer for temporarily storing print information received from the information processing apparatus 101. Further, the RAM 153 includes a memory area for storing information indicating whether it is the first time to set a setting for the communication apparatus 151 after power is supplied (hereinafter, "initial setting time"). In other words, the initial setting time is a time when the communication apparatus 151 is in an initial setting state without completion of an initial setting process described below. The initial setting process is a process conducted based on a user operation.

The ROM 152 stores fixed data, such as control programs to be performed by the CPU 154, data tables, and OS programs. According to the present exemplary embodiment, each control program stored in the ROM 152 performs software execution control, such as scheduling, task switching, and interrupting processing, under management of an embedded OS stored in the ROM 152. The ROM 152 also includes a memory area for storing data, such as settings information about the communication apparatus 151 and management data of the communication apparatus 151, that is to be retained even in a case where no power is supplied.

The CPU 154 is a system control unit and controls the entire communication apparatus 151.

The print engine 155 forms an image on a recording medium, such as paper, using a recording agent, such as ink, on the basis of information stored in the RAM 153 and a print job received from the information processing apparatus 101, and outputs the print result. At this time, the print job transmitted from the information processing apparatus 101 is received via the communication unit 156, which is capable of performing communication at higher speed than that of the near-field wireless communication unit 157, because the print job has a large amount of transmission data and high-speed communication is required.

The input interface 158 is an interface for receiving data input or operation instructions from the user, and includes a physical keyboard, a button, and/or a touch panel. The output interface 159 and the input interface 158 can be integrated into a single component that outputs screens and receives operations from the user. The output interface 159 is an interface for the operation display unit 160 to control data display and provision of notifications of states of the communication apparatus 151.

The operation display unit 160 includes a display unit, such as a LED and a LCD. The operation display unit 160 displays data and provides notifications of states of the communication apparatus 151. A software keyboard can receive input from the user via the operation display unit 160 by having keys, such as a numeric value input key, a mode setting key, a set key, a cancel key, and a power key, on the operation display unit 160.

<Direct Connection Method>

The direct connection is a form of establishing a direct (i.e., peer to peer) wireless connection between apparatuses without using an external device, such as the access point 131. The communication apparatus 151 is operable in a mode for communication via a direct connection (direct connection mode) as one of connection modes. In Wi-Fi communication, there is a plurality of modes for communication via a direct connection, such as a software access point (software AP) mode and a Wi-Fi Direct® (WM) mode.

The WFD mode is a mode in which a direct connection is performed using WFD. WFD is a standard developed by the Wi-Fi Alliance. In the WFD mode, a device to function as a peer-to-peer (P2P) group owner and a device to function as a P2P client are determined after a device to communicate with is detected using a device search command, and then the remaining wireless connection process is performed. The determination of the functions corresponds to, for example, group owner (GO) negotiation in P2P. Specifically, first, one of devices that are to communicate with each other issues a device search command and searches for a device to connect to in the WFD mode. Once the other device to communicate with is detected, the both devices check information about services and functions that the devices can provide. The checking of device provision information is not compulsory but optional. This device provision information checking phase corresponds to, for example, provision discovery in P2P. Next, the devices determine which one of the devices is to function as a P2P client while the other functions as a P2P group owner by checking the device provision information each other. After the client and the group owner are determined, the client and the group owner exchange parameters for performing communication using WFD. The P2P client and the P2P group owner perform the remaining wireless connection process and an Internet Protocol (IP) connection process on the basis of the exchanged parameters. In the WFD mode, the communication apparatus 151 can always operate as a group owner without performing the GO negotiation described above. Specifically, the communication apparatus 151 can operate in the WFD mode as an autonomous GO mode. A state where the communication apparatus 151 operates in the WFD mode is, for example, a state where no WFD connections are established but the communication apparatus 151 operates as a group owner or a state where a WFD connection is established and the communication apparatus 151 operates as a group owner.

In the software AP mode, one (e.g., the information processing apparatus 101) of devices to communicate with each other (e.g., the information processing apparatus 101 and the communication apparatus 151) is identified as a client to play a role of requesting various services. The other device realizes a Wi-Fi access point function using software settings. In the software AP mode, the client searches for a device to be a software AP using a device search command. Once a software AP is detected, the client and the software AP perform the remaining wireless connection process (e.g., wireless connection establishment), and thereafter perform an IP connection process (e.g., IP address assignment). The client and the software AP can use commands and parameters that are defined in the Wi-Fi standards as commands and parameters transmitted and received to and from the client and the software AP in realizing a wireless connection between the client and the software AP, and descriptions thereof are omitted herein. Further, a state where the communication apparatus 151 operates in the software AP mode is, for example, a state where no Wi-Fi connections are established but the communication apparatus 151 operates as a software AP or a state where a Wi-Fi connection is established and the communication apparatus 151 operates as a software AP.

According to the present exemplary embodiment, the communication apparatus 151 operates as a parent device in a network to which the communication apparatus 151 belongs in a case where the communication apparatus 151 operates in the direct connection mode. The parent device is a device that forms a wireless network and provides a child device with parameters for use in connecting to the wireless network. Examples of parameters for use in connecting to a wireless network include a parameter relating to a communication channel that the parent device uses. The child device receives the parameters and connects to the wireless network formed by the parent device using the communication channel used by the parent device. In the direct connection mode, the communication apparatus 151 operates as a parent device, and thus the communication apparatus 151 can determine which communication channel is to be used in communication in the direct connection mode. In a case where, for example, the communication apparatus 151 operates in an infrastructure connection mode and in the direct connection mode simultaneously, the communication apparatus 151 performs control such that a communication channel used in communication in the infrastructure connection mode is also used in communication in the direct connection mode. For example, the communication apparatus 151 can preferentially select a communication channel for use in connecting to the access point 131 over other channels as a channel for use in communication in the direct connection mode.

Connection information (e.g., service set identifier (SSID) and password) for connecting to the communication apparatus 151 in the direct connection mode can be changed as desired by a user operation on an operation unit of the communication apparatus 151.

<Infrastructure Connection Method>

The infrastructure connection is a form in which devices to communicate with each other (e.g., the information processing apparatus 101 and the communication apparatus 151) connect to an access point (e.g., the access point 131) managing a network of the devices and to communicate with each other via the access point. The communication apparatus 151 is also operable in a mode (infrastructure connection mode) for communicating via an infrastructure connection as one of the connection modes.

In the infrastructure connection, the devices search for the access point using a device search command. Once the access point is detected, the devices and the access point perform the remaining wireless connection process (e.g., wireless connection establishment) and thereafter perform the IP connection process (IP address assignment). The devices and the access point can use commands and parameters that are defined in the Wi-Fi standards as commands and parameters transmitted and received to and from each other in realizing a wireless connection, and descriptions thereof are omitted herein.

According to the present exemplary embodiment, in a case where the communication apparatus 151 operates in the infrastructure connection mode, the access point 131 operates as a parent device and the communication apparatus 151 as a child device. The communication apparatus 151 and the information processing apparatus 101 can communicate with each other via the access point 131. The communication via the infrastructure connection can use a channel of a frequency band other than 2.4 GHz (e.g., 5.0 GHz band). To communicate with the communication apparatus 151 via the access point 131, the information processing apparatus 101 needs to recognize that the communication apparatus 151 belongs to the network that is formed by the access point 131 and to which the information processing apparatus 101 belongs.

According to the present exemplary embodiment, an infrastructure connection state is a state where the information processing apparatus 101 and the communication apparatus 151 are simply connected to the same access point. Specifically, in the infrastructure connection state, the information processing apparatus 101 and the communication apparatus 151 are to be connected to the same access point but do not have to recognize that the partner apparatus is also on the same network. According to the present exemplary embodiment, the communication apparatus 151 can establish a direct connection and an infrastructure connection simultaneously. In other words, the communication apparatus 151 can establish a Wi-Fi connection in which the communication apparatus 151 operates as a child device simultaneously with establishing a Wi-Fi connection in which the communication apparatus 151 operates as a parent device. The operation in the state where the two connections are simultaneously established as described above is referred to as "simultaneous operation". In performing the simultaneous operation, the communication apparatus 151 matches the frequency band and the communication channel for use in the infrastructure connection and the frequency band and the communication channel for use in the direct connection. However, according to the present exemplary embodiment, the communication apparatus 151 does not operate in the direct connection and thus does not perform the simultaneous operation, in a case where the communication apparatus 151 uses the 5-GHz frequency band in the infrastructure connection. This is due to the possibility that the communication channel to be used may be changed by Dynamic Frequency Selection (DFS) in a case where the 5-GHz frequency band is used.

<Connection Setting Process>

According to the present exemplary embodiment, the information processing apparatus 101 performs setting (connection setting) for operating the communication apparatus 151 using at least one of the communication methods of the infrastructure connection and the direct connection, by using wireless communication with the communication apparatus 151. A connection setting process according to the present exemplary embodiment is performed via wireless communication and is thus referred to also as "cableless setup" (CLS). Alternatively, the connection setting process can be performed via wired communication.

The communication apparatus 151 is operable in a connection setting mode (connection setting state). The connection setting mode is a mode for performing the connection setting process, and the communication apparatus 151 performs the connection setting process in a state of operation in the connection setting mode. Details of the connection setting mode will be described below.

To cause the communication apparatus 151 to operate in the infrastructure connection mode, the information processing apparatus 101 wirelessly transmits infrastructure setting information to the communication apparatus 151. The infrastructure setting information is settings information for operating in the infrastructure connection mode. The infrastructure setting information includes information about the access point 131. The information about the access point 131 is, for example, SSID, password, and frequency band information.

In contrast, to cause the communication apparatus 151 to operate in the direct connection mode, the information processing apparatus 101 wirelessly transmits direct setting information to the communication apparatus 151. The direct setting information is settings information for operating in the direct connection mode. The direct setting information includes an instruction to enable a WFD function to cause the communication apparatus 151 to operate as a group owner and an instruction to enable an access point setting of the communication apparatus 151. The information processing apparatus 101 also acquires necessary connection information for establishing a direct connection with the communication apparatus 151 from the communication apparatus 151. The connection information for establishing a direct connection with the communication apparatus 151 includes, for example, SSID and password information about the communication apparatus 151.

According to the present exemplary embodiment, the direct connection for the connection setting between the information processing apparatus 101 and the communication apparatus 151 is used to transmit the infrastructure setting information and the direct setting information and to acquire the information for establishing a direct connection with the communication apparatus 151 in the connection setting process. While the connection setting process using is performed as the direct connection for the connection setting according to the present exemplary embodiment, a wireless communication standard other than such as Bluetooth, can be used, or a wired communication standard, such as a wired LAN or a universal serial bus (USB), can be used.

Once an infrastructure connection using Wi-Fi or a direct connection is established between the information processing apparatus 101 and the communication apparatus 151 by the connection setting process, the information processing apparatus 101 and the communication apparatus 151 can communicate with each other via the established connection. Specifically, for example, the information processing apparatus 101 can transmit a print job for causing the communication apparatus 151 to perform printing or a scan job for causing the communication apparatus 151 to perform scanning, to the communication apparatus 151 via the established connection.

The connection setting process can cause the communication apparatus 151 to operate in the infrastructure connection mode and to operate in the direct connection mode according to the present exemplary embodiment, but this is not a limiting form. For example, the connection setting process can only cause the communication apparatus 151 to operate in the infrastructure connection mode in which, in other words, the connection setting process cannot cause the communication apparatus 151 to operate.

<Connection Setting Mode>

As described above, the communication apparatus 151 is operable in the connection setting mode. A trigger for a start of the operation of the communication apparatus 151 in the connection setting mode can be, for example, a press of a button for the connection setting mode by the user or activation (shift to a software-on state) of the communication apparatus 151. The button for the connection setting mode can be a hardware button of the communication apparatus 151 or can be a software button displayed by the communication apparatus 151 on the operation display unit 160.

Once the communication apparatus 151 starts operation in the connection setting mode, the communication apparatus 151 enables Wi-Fi communication. Specifically, the communication apparatus 151 operates as a dedicated AP for the connection setting mode. This makes the communication apparatus 151 to be in a state where the communication apparatus 151 can establish a direct connection with the information processing apparatus 101 using Wi-Fi. The connection information (e.g., SSID) for connecting to the dedicated AP for the connection setting mode is stored in advance in a setup program installed in the information processing apparatus 101, and the information processing apparatus 101 recognizes in advance the connection information for connecting to the dedicated software AP for the connection setting mode. Thus, at least part of the connection information (at least part of SSID) for connecting to the dedicated software AP mode for the connection setting mode cannot be changed as desired by the user, unlike the connection information about the access point that is enabled in the direct connection mode. Further, according to the present exemplary embodiment, there are no passwords for connecting to the dedicated software AP for the connection setting mode, and the information processing apparatus 101 can connect to the communication apparatus 151 operating in the connection setting mode without using a password as long as the information processing apparatus 101 recognizes the SSID. This is not a limiting form. For example, a password for connecting to the dedicated software AP for the connection setting mode can also be stored in advance in the setup program, and a connection can be established with the communication apparatus 151 operating in the connection setting mode using the password.

In the connection setting mode, the communication apparatus 151 can connect to the information processing apparatus 101 using WFD instead of normal In other words, the communication apparatus 151 can operate as a group owner and receive the settings information from the information processing apparatus 101 via WFD communication. In the connection setting mode, the communication apparatus 151 can also connect to the information processing apparatus 101 using Bluetooth. Specifically, the communication apparatus 151 can operate as a Bluetooth follower device (slave device) and receive the settings information from the information processing apparatus 101 via communication using Bluetooth (communication via a Bluetooth connection). Bluetooth can be Bluetooth Classic or Bluetooth Low Energy®. In a case where Bluetooth Low Energy is used, once the communication apparatus 151 starts operating in the connection setting mode, the communication apparatus 151 starts transmitting advertisement information based on the Bluetooth Low Energy standard, and the information processing apparatus 101 having received the advertisement information is changed to a state where a Bluetooth Low Energy connection can be established with the information processing apparatus 101. Further, the connection setting mode can be a state where both and Bluetooth can be used. Specifically, in a case where a connection request is received from the information processing apparatus 101 using Wi-Fi, the communication apparatus 151 operating in the connection setting mode can receive the settings information via Wi-Fi connection. Whereas in a case where a connection request is received from the information processing apparatus 101 using Bluetooth, the communication apparatus 151 operating in the connection setting mode can receive the settings information via Bluetooth connection.

A condition for ending the operation in the connection setting mode according to the present exemplary embodiment is that, for example, a connection mode (direct connection mode or infrastructure connection mode) is set for the communication apparatus 151 based on the settings information received from the information processing apparatus 101. A further condition is that a connection setting mode elapsed time exceeds a predetermined threshold value (timeout time). The connection setting mode elapsed time is the time that passes from the start of the operation in the connection setting mode without ending the operation in the connection setting mode. Specifically, a count of the connection setting mode elapsed time is stopped when the operation in the connection setting mode is ended. The connection setting mode elapsed time is not limited to this form and can be, for example, the time that passes from the start of the operation in the connection setting mode without establishment of a connection between the information processing apparatus 101 and the communication apparatus 151 via the AP for the connection setting mode. In other words, the count of the connection setting mode elapsed time can be stopped when a connection is established between the information processing apparatus 101 and the communication apparatus 151 via the AP for the connection setting mode. Further, the connection setting mode elapsed time can be the time that passes from the start of the operation in the connection setting mode without reception of the settings information transmitted from the information processing apparatus 101 by the communication apparatus 151. In other words, the count of the connection setting mode elapsed time can be stopped when the settings information transmitted from the information processing apparatus 101 is received by the communication apparatus 151. The timeout time is set because the connection setting mode is a mode in which a connection can be established without a password or a mode in which a connection can be established using a password stored in advance in the setup program. Specifically, while the connection setting mode has an advantage of ease of connection, the connection setting mode is less secure, so that the possibility of establishment of a connection that is unintended by the user of the communication apparatus 151 increases if the connection setting mode is maintained for a long time.

One of conditions for a start of the operation in the connection setting mode according to the present exemplary embodiment is that, for example, a press of a power button is accepted in a state where the initial setting of the communication apparatus 151 is not completed.

After starting operation in the connection setting mode as a result that the condition is satisfied, the communication apparatus 151 performs the initial setting process. However, the initial setting process is conducted by receiving user operations by the communication apparatus 151, and thus the time from the start to the completion of the initial setting process varies depending on a user performing the operation. A user may start operating the information processing apparatus 101 for the connection setting process after the communication apparatus 151 completes the initial setting process. The communication apparatus 151 according to the present exemplary embodiment starts operation in the connection setting mode before the initial setting process is completed. Thus, there arises an issue that the count value of the connection setting mode elapsed time up to the timing of the completion of the initial setting process may be a great value, in a case where a user operation for the initial setting process takes time and the communication apparatus 151 completes the initial setting process late. In other words, there is an issue that only a small amount of time may remain after the completion of the initial setting process before the connection setting mode elapsed time exceeds the timeout time.

To solve the above-described issues, the timeout time of the connection setting mode is appropriately controlled according to the present exemplary embodiment. Specifically, according to the present exemplary embodiment, the timeout time is controlled based on the connection setting mode elapsed time at the timing of the completion of the initial setting process. More specifically, according to the present exemplary embodiment, the timeout time is extended, if the connection setting mode elapsed time at the timing of the completion of the initial setting process is long. This allows enough time for the user to perform operations for the connection setting process even if the completion of the initial setting process by the communication apparatus 151 is delayed.

<Configuration of Operation Display Unit of Communication Apparatus>

Figure 2A:
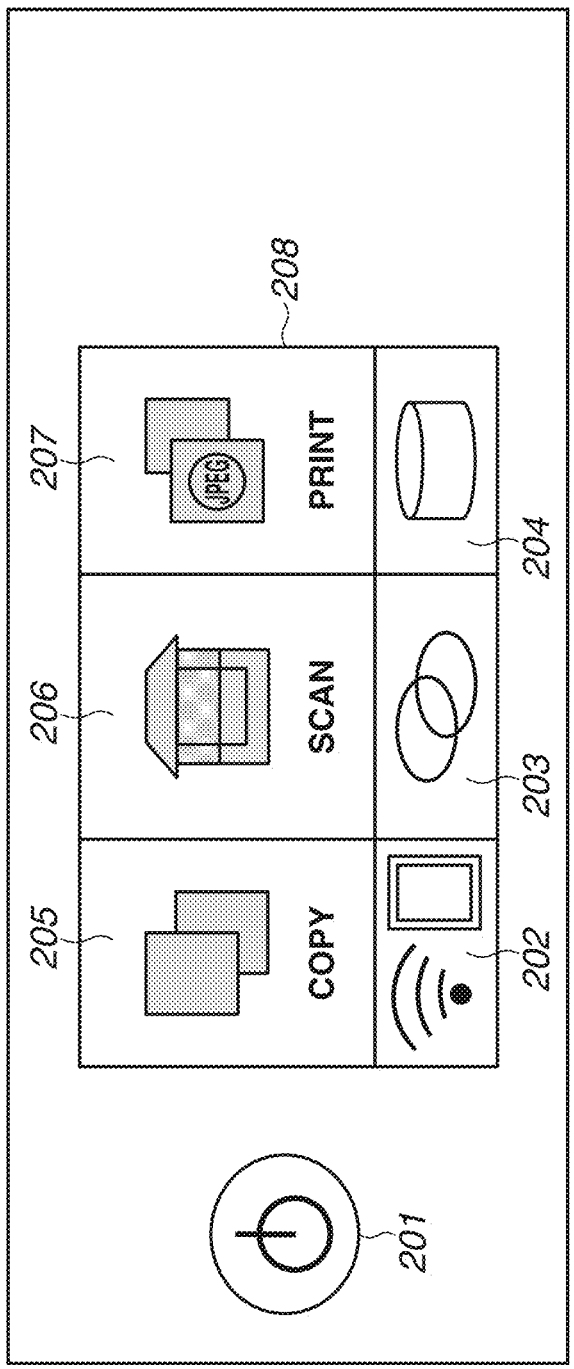
FIGS. 2A and 2B are diagrams each illustrating an example of an operation display unit of a communication apparatus according to an exemplary embodiment of the present invention.
Figure 2B:
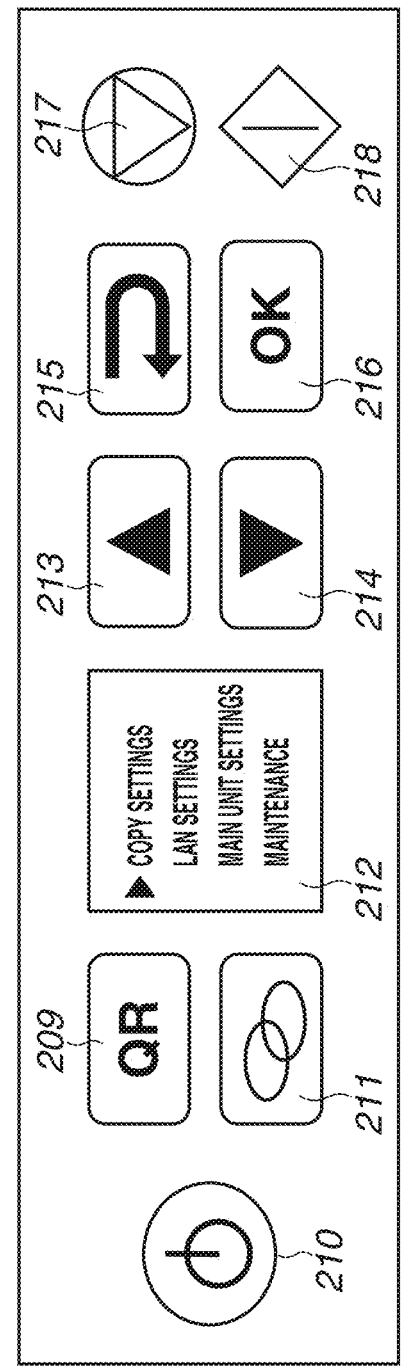

FIGS. 2A and 2B are diagrams schematically illustrating an example of a configuration of the operation display unit 160 of the communication apparatus 151.

In FIG. 2A, a panel 208 is a touch panel, and the user can operate the communication apparatus 151 by touching the panel 208. A power button 201 is a physical button situated at a periphery of the panel 208. When the power button 201 is pressed by the user in a state where the communication apparatus 151 is in a software-off state, power is supplied to the entire communication apparatus 151 and the communication apparatus 151 shifts to the software-on state. The software-off state is a state where power is supplied to minimum components of the communication apparatus 151, such as the CPU 154, while no power is supplied to, for example, the print engine 155 and a display unit of the operation display unit 160.

The software-on state is a state where power is supplied to the entire configuration of the communication apparatus 151, which includes the print engine 155 and the operation display unit 160.

Once the communication apparatus 151 shifts to the software-on state, a home screen is displayed on the panel 208. The home screen is an uppermost hierarchical layer of a menu operable by the user. The home screen includes a copy region 205 for receiving instructions to perform a copy process, a scan region 206 for receiving instructions to perform a scan process, and a print region 207 for receiving instructions to perform a print process. The home screen further includes a state display region 202 for displaying settings and connection states of the infrastructure connection and the direct connection of the communication apparatus 151, a connection setting mode region 203 for starting the operation in the connection setting mode at any timing by the user, and a setting region 204 for changing various settings.

FIG. 2B illustrates an example of a configuration of the operation display unit 160 with a smaller display unit than that illustrated in FIG. 2A. In this example, buttons 209, 210 and 211 and buttons 213 to 218 are physical buttons. The user turns on the communication apparatus 151 by pressing the power button 210.

When the communication apparatus 151 is turned on, a home screen is displayed on a panel 212. The home screen is an uppermost hierarchical layer of a menu operable by the user. The user can operate a cursor displayed on the panel 212 by pressing the operation button 213 or 214. The user presses the OK button 216 to perform an operation or presses the RETURN button 215 to return to the previous menu screen. The panel 212 can also display a Quick Response (QR) code® including information for establishing a direct connection with the communication apparatus 151 at a press of the QR button 209. Reading the QR code from the information processing apparatus 101 establishes a direct connection between the information processing apparatus 101 and the communication apparatus 151 to enable wireless communication between the information processing apparatus 101 and the communication apparatus 151. Specifically, the information included in the QR code is connection information for establishing a connection with the communication apparatus 151 operating in the direct connection mode. The communication apparatus 151 starts operation in the direct connection mode at a press of the QR button 209. The communication apparatus 151 starts operation in the connection setting mode at a press of the connection setting mode button 211. The communication apparatus 151 cancels performance of currently-performed various processes at a press of the stop button 217. The communication apparatus 151 starts the copy process at a press of the copy start button 218.

<Processes Performed by Apparatuses of System>

Figure 3A:
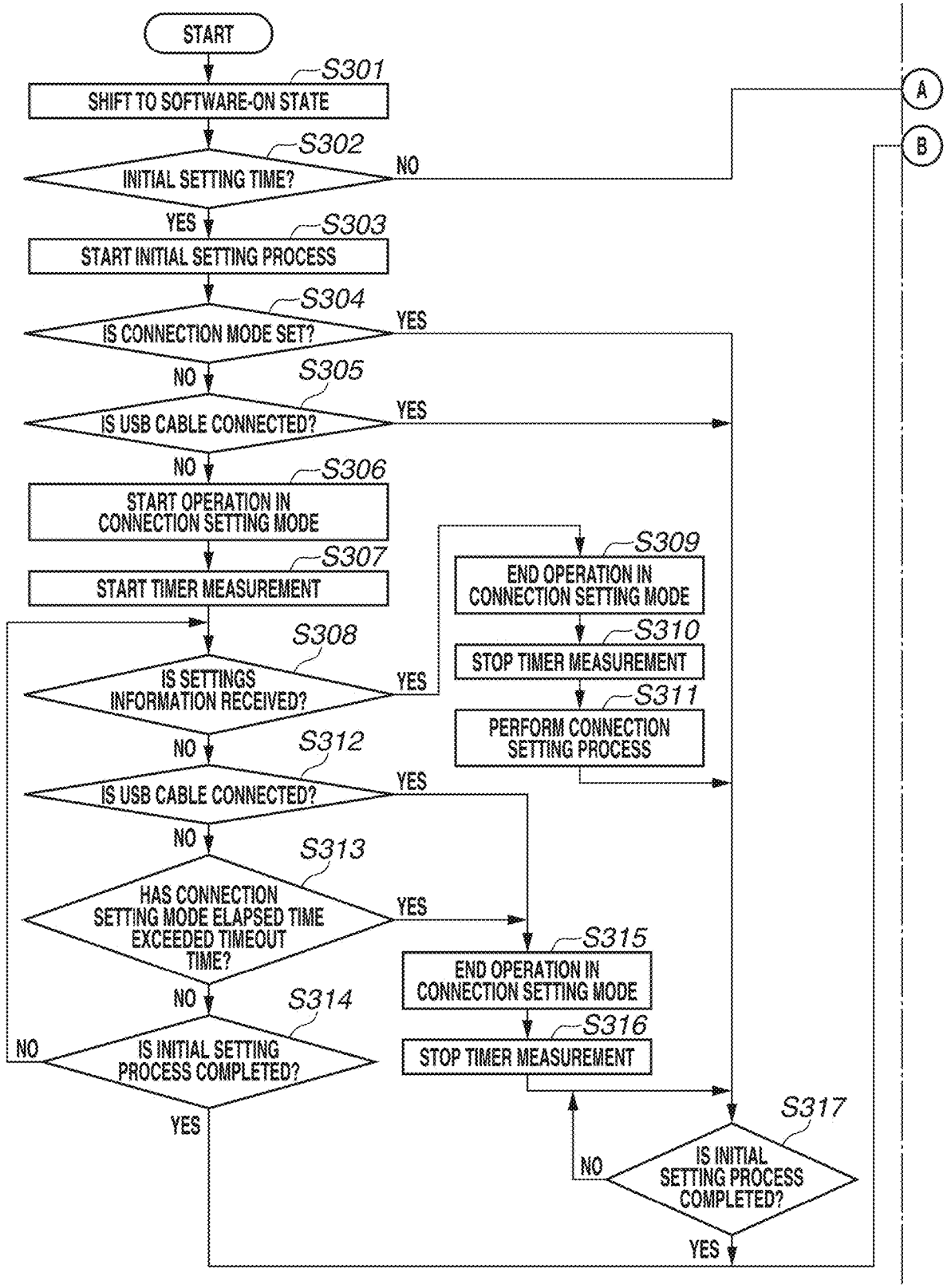
FIGS. 3A and 3B illustrate a flowchart of a process that is performed by a communication apparatus in a case where a press of a power button is received according to an exemplary embodiment of the present invention.
Figure 3B:
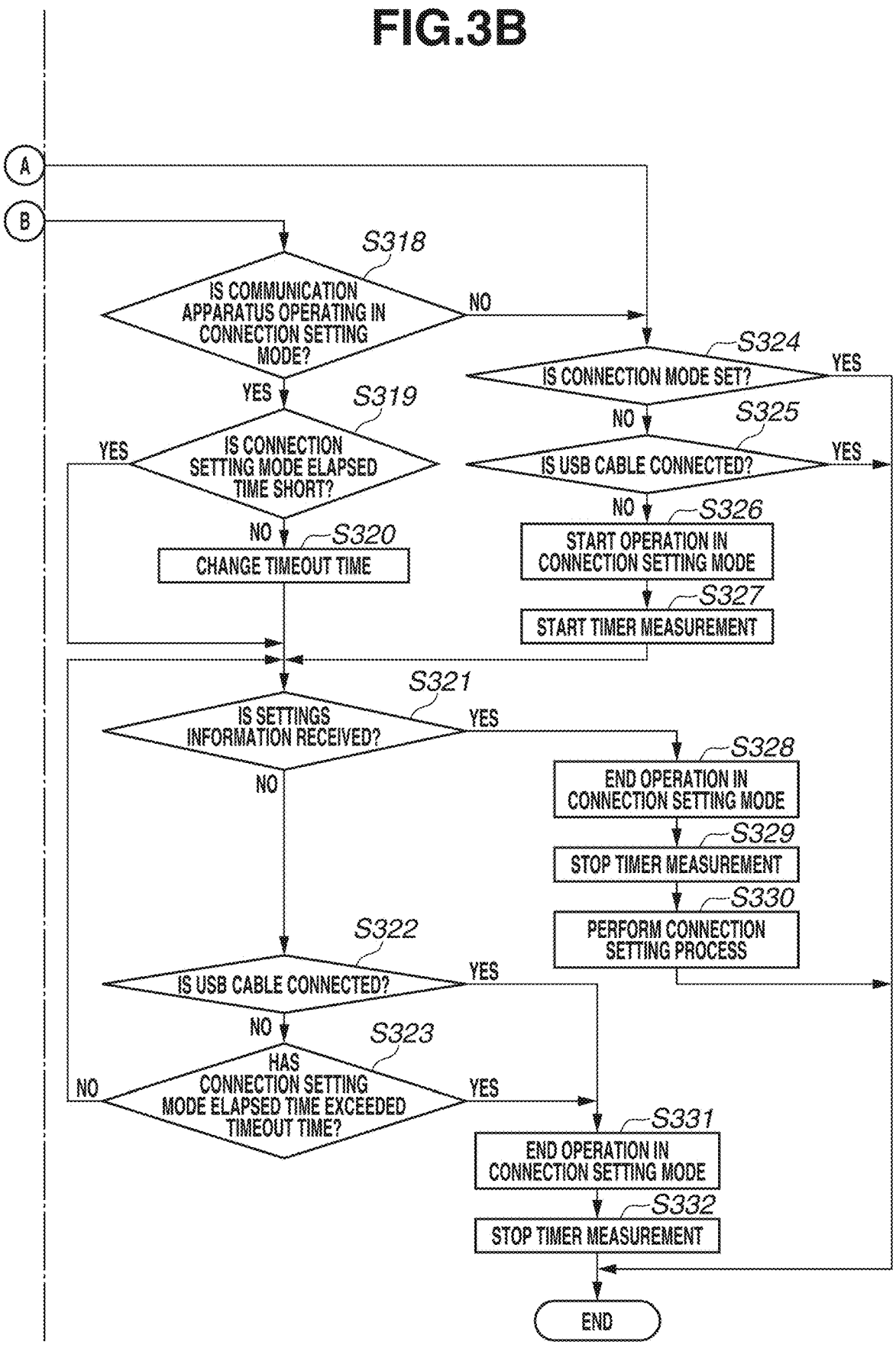

FIGS. 3A and 3B illustrate a flowchart of a process that is performed when the communication apparatus 151 accepts a press of the power button. The flowchart in FIG. 3 is realized by, for example, the CPU 154 by reading a program stored in the ROM 152 to the RAM 153 and executing the read program.

Further, the flowchart illustrated in FIGS. 3A and 3B is started when the communication apparatus 151 in the software-off state accepts a press of the power button from the user.

In step S301, the CPU 154 starts supplying power to the entire communication apparatus 151 and shifts the communication apparatus 151 from the software-off state to the software-on state.

In step S302, the CPU 154 refers to the information that is stored in the RAM 153 and indicates whether it is the initial setting time, and the CPU 154 determines whether it is the initial setting time. Specifically, an initial setting time flag in the RAM 153 is on, when the user activates the communication apparatus 151 (when the user presses the power button to shift the communication apparatus 151 to the software-on state) for the first time after reception of the communication apparatus 151. In contrast, when it is the second or subsequent time to activate the communication apparatus 151 after the initial setting process is completed, the initial setting time flag in the RAM 153 is off. In other words, the CPU 154 realizes the determination in step S302 by checking whether the initial setting time flag is on or off. Alternatively, the determination can be realized, for example, by determining whether the communication apparatus 151 has previously performed the initial setting process. If the CPU 154 determines that it is the initial setting time (YES in step S302), the processing proceeds to step S303. If the CPU 154 determines that it is not the initial setting time (NO in step S302), the processing proceeds to step S324. While the process of step S302 is performed based on whether the initial setting time flag is on or off according to the present exemplary embodiment, information other than flags can be used. In this case, for example, information indicating that it is the initial setting time is stored in the RAM 153 at the time of reception of the communication apparatus 151.

If the CPU 154 determines that it is not the initial setting time (NO in step S302), the CPU 154 can end the process in the flowchart without performing the connection setting process. At this time, the CPU 154 can display a user interface (UI) to prompt the user to select whether to perform a connection mode setting process and can control whether to proceed to step S324 or end the process in the flowchart based on a response from the user.

If the CPU 154 determines that it is the initial setting time (YES in step S302), the CPU 154 displays a screen for the initial setting process through the initial setting process started in step S303, whereas even if the CPU 154 determines that it is not the initial setting time (NO in step S302), the CPU 154 displays, for example, the home screen. Even if the CPU 154 determines that it is not the initial setting time (NO in step S302) and the communication apparatus 151 thereafter starts operation in the connection setting mode, a screen for the connection setting mode indicating that the communication apparatus 151 is in the connection setting mode can be displayed.

In step S303, the CPU 154 starts the initial setting process. Step S304 and subsequent steps are started without waiting for the completion of the initial setting process and are performed in parallel with the initial setting process started at this time. Details of the initial setting process will be described below with reference to FIG. 4.

FIG. 4 is a flowchart illustrating the initial setting process that is performed by the communication apparatus 151 according to the present exemplary embodiment. The flowchart in FIG. 4 is realized by, for example, the CPU 154 by reading a program stored in the ROM 152 and executing the read program. The flowchart in FIG. 4 is started when step S303 is performed.

In step S401, the CPU 154 determines whether an ink cartridge is attached to the communication apparatus 151 based on a detection result by a detection unit (not illustrated) of the communication apparatus 151. If a recording head and an ink tank are in a separated manner, the CPU 154 determines whether at least a recording head is attached to the communication apparatus 151. If the CPU 154 determines that an ink cartridge is attached to the communication apparatus 151 (YES in step S401), the processing proceeds to step S402. If the CPU 154 determines that no ink cartridges are attached to the communication apparatus 151 (NO in step S401), the processing proceeds to step S403. An operation of attaching an ink cartridge or a recording head is an operation that is to be performed on the communication apparatus 151 by the user.

In step S403, the CPU 154 provides an ink cartridge notification to the user by flashing the LED of the operation display unit 160 or displaying a specific screen on the operation display unit 160. Specifically, the CPU 154 provides a notification that the communication apparatus 151 is in a state of waiting for attachment of an ink cartridge or provides a notification of how to attach an ink cartridge. Methods for the notifications are not particularly limited. For example, the CPU 154 can provide an audio notification using a speaker (not illustrated).

Thereafter, in step S404, the CPU 154 determines whether an ink cartridge is attached to the communication apparatus 151 based on a detection result by the detection unit (not illustrated) of the communication apparatus 151. As in step S401, in a case where a recording head and an ink tank are separated, the CPU 154 determines whether at least the recording head is attached to the communication apparatus 151, in a case where the recording head and the ink tank are separated, if the CPU 154 determines that an ink cartridge is attached to the communication apparatus 151 (YES in step S404), the processing proceeds to step S402. In contrast, if the CPU 154 determines that no ink cartridges are attached to the communication apparatus 151 (NO in step S404), step S404 is performed again. According to the present exemplary embodiment, no timeout time is set for the determination of step S403, and the determination of step S403 is repeated until an ink cartridge is attached by the user or the communication apparatus 151 shifts to the software-off state. Thus, if it takes time for the user to complete attachment of an ink cartridge, it also takes time to complete the initial setting process. In a case where a skip operation to skip attachment of an ink cartridge is performed by the user, the CPU 154 can determine that an ink cartridge is attached to the communication apparatus 151 (YES in step S404). The CPU 154 can continue the notification of step S403 until the CPU 154 determines that an ink cartridge is attached to the communication apparatus 151 (YES in step S404).

In step S402, the CPU 154 starts an initial setting time cleaning process. Specifically, the CPU 154 moves a carriage to a position where a cleaning member, such as a waste ink absorber and a capping mechanism for capping a discharge outlet of a recording head, is situated.

Thereafter, the CPU 154 caps the discharge outlet of the recording head using the capping mechanism and actuates a pump connected to the capping mechanism. By performing this operation, the CPU 154 generates negative pressure in the capping mechanism and discharges foreign matter, such as thickened ink and air bubbles, by suction through the discharge outlet to refresh the ink in the discharge outlet. The CPU 154 wipes foreign matter, such as ink, attached to a discharge outlet surface of the recording head by using a wiper. The cleaning process is also performed at timings other than the initial setting time, e.g., a timing before the printing is started, a timing when a predetermined time has passed since the previous printing, and a timing of a shift to the software-on state after an abnormality ends. Such a normal cleaning process can be different from the initial setting time cleaning process. Specifically, the suction power of the negative pressure, the amount of suction, and the number of times of suction can be set greater in the initial setting time than in the normal cleaning operation in order to fill a flow path from a head to a nozzle or a flow path from an ink tank to the head with ink. Alternatively, the ink in the recording head can be heated to decrease the viscosity.

The CPU 154 detects errors that occur in the communication apparatus 151 during the initial setting time cleaning process. Examples of errors that may be detected by the detection include an incomplete head attachment error and a carriage position error.

The incomplete head attachment error is an error coming from incomplete attachment of art ink cartridge (recording head) to the carriage. For example, if an ink cartridge is incompletely attached to the carriage, the ink cartridge may extend over a driving path of the carriage. In this case, the ink cartridge hits a predetermined component in the isolation apparatus 151 while the carriage moves, and this causes the carriage to stop at the position of the component. The CPU 154, for example, detects the amount of movement of the carriage and determines that the incomplete head attachment error has occurred if the detected amount of movement corresponds to the amount of movement from the position where the cartridge is attached to the position of the component. Further, in a case where, for example, an ink cartridge is incompletely attached to the carriage, the ink cartridge may detach from the carriage while the carriage is moved or during the cleaning process. The CPU 154 detects whether an ink cartridge is attached to the carriage using, for example, a cartridge sensor. If the cartridge sensor detects no ink cartridges attached to the carriage while the carriage is moved or during the cleaning process, the CPU 154 determines that the incomplete head attachment error has occurred. The incomplete head attachment error is resolved if the user opens the cover again and attaches the cartridge correctly.

The carriage position error is an error of the presence of foreign matter on the driving path of the carriage. For example, if foreign matter is on the driving path of the carriage, the foreign matter inhibits movement of the carriage, so that the amount of movement of the carriage is small. Thus, the CPU 154 detects, for example, the actual amount of movement of the carriage and the force (driving force) used to drive the carriage, and the CPU 154 determines that the carriage position error has occurred if the actual amount of movement is less than the driving force. The carriage position error is resolved when the user removes the foreign matter.

If an error is detected, the CPU 154 performs an error notification process to provide a notification of the detected error. Specifically, for example, a screen for providing a notification of the detected error is displayed on the operation display unit 160. If the communication apparatus 151 has a connection with the information processing apparatus 101 as a result of the start of the connection setting process at the time of the detection of the error, the CPU 154 transmits information for displaying the detected error on the display unit of the information processing apparatus 101 to the information processing apparatus 101. The CPU 154 can be configured to perform the error notification process in a case where an inquiry is received from the information processing apparatus 101 to which the communication apparatus 151 is connected.

In step S405, the CPU 154 determines whether all processes included in the initial setting process are completed. If not all the processes included in the initial setting process are completed (NO in step S405), the CPU 151 repeats step S405 until all the processes included in e initial setting process are completed. In contrast, if all the processes included in the initial setting process are completed (YES in step S405), the processing proceeds to step S406. In a case where an error that is described above occurs, the initial setting process further includes a process of detecting a state where the error is resolved. Thus, it is determined that one of the processes included in the initial setting process is completed when the error is resolved by a user operation. According to the present exemplary embodiment, the initial setting process includes the process of detecting an attached ink cartridge and the initial setting time cleaning process as described above. This, however, is not a limiting form. For example, the initial setting process can include a process of receiving a user operation for setting a language for use in display by the communication apparatus 151, a process of receiving a user operation for answering a questionnaire about an environment where the communication apparatus 151 is used, and a registration adjustment process. The processes included in the initial setting process can be performed in any order.

If all the processes included in the initial setting process are completed (YES in step S405), the CPU 154 changes the information indicating whether it is the initial setting time so that the changed information indicates that it is not the initial setting time when the communication apparatus 151 shifts to the software-on state next and the subsequent times. Specifically, the CPU 154 changes the content of the initial setting time flag. The timing to change the information indicating whether it is the initial setting time is not limited to the timing described above and can be any time after the determination of whether it is the initial setting time is performed.

In step S406, the CPU 154 flashes the LED of the operation display unit 160 or displays a specific screen on the operation display unit 160, thereby providing a notification about the completion of the initial setting process to the user. Specifically, the CPU 154 displays, for example, a screen notifying the user of the completion of the initial setting process on the operation display unit 160. Methods for the notifications are not particularly limited. For example, the CPU 154 can provide an audio notification using the speaker (not illustrated).

In step S407, the CPU 154 displays the home screen on the operation display unit 160.

Thereafter, the CPU 154 ends the process in the flowchart.

As described above, the user needs to perform an operation of attaching an ink cartridge in order to complete the initial setting process. The user also needs to remove packing materials of the communication apparatus 151 if the user has just unpacked the communication apparatus 151. As described above, various user operations need to be performed to complete the initial setting process, and thus time required to complete the initial setting process varies depending on the user.

Description will be returned to FIG. 3A.

In step S304, the CPU 154 determines whether any connection mode has been already set for the communication apparatus 151. A connection mode other than the direct connection mode and the infrastructure connection mode can be set for the communication apparatus 151. For example, a wired LAN connection mode can be set. The wired LAN connection mode is a mode of connecting to another apparatus via a wired LAN. According to the present exemplary embodiment, if the wired LAN connection mode is set for the communication apparatus 151, the direct connection mode or the infrastructure connection mode cannot be set, and the communication apparatus 151 cannot perform wireless LAN communication (communication complying with the IEEE 802.11 series communication standards). The wired LAN connection mode can be preset for the communication apparatus 151 even if no wired LANs are connected to the communication apparatus 151. The CPU 154 can also determine whether the communication apparatus 151 has a previous connection to an external access point in the infrastructure connection mode. Specifically, the communication apparatus 151 stores information about a previously-connected external access point in a predetermined storage region. If the information about previously-connected external access point is stored in the corresponding storage region, the CPU 154 determines that the communication apparatus 151 has a previous connection to the external access point. If no information about a previously-connected external access point is stored while a default value is stored in the corresponding storage region, the CPU 154 determines that the communication apparatus 151 has no previous connections to the external access point. The information stored in the corresponding storage region can be reset to the default value by a reset operation. The reset operation is an operation of resetting the connection setting of the communication apparatus 151 that is performed on the communication apparatus 151 and is different from an operation of pressing a power button. If the reset operation is performed, the communication apparatus 151 resets the connection mode set for the communication apparatus 151 and returns to a state where no connection modes are set. Thus, if the CPU 154 determines that a connection mode is set fir the communication apparatus 151 (YES in step S304), it is determines that a connection mode is already set or has been previously set for the communication apparatus 151. Thus, if the CPU 154 determines that a connection mode is set for the communication apparatus 151 (YES in step S304), the CPU 154 determines that the connection setting process is unnecessary, and the processing proceeds to step S317 without causing the communication apparatus 151 to start operation in the connection setting mode. In contrast, if the CPU 154 determines that no connection modes are set for the communication apparatus 151 (NO in step S304), the processing proceeds to step S305.

In step S305, the CPU 154 determines whether a USB cable is connected to the communication apparatus 151. If a USB cable is connected (YES in step S305), the communication apparatus 151 is likely to communicate with another apparatus via not a wireless network but the USB. Thus, if the CPU 154 determines that a USB cable is connected (YES in step S305), the CPU 154 determines that the connection setting process is unnecessary, and the processing proceeds to step S317 without causing the communication apparatus 151 to start operation in the connection setting mode. While the CPU 154 determines whether a USB cable is connected herein, the CPU 154 can also determine whether a wired LAN cable is connected. Further, the CPU 154 can determine both whether a USB cable is connected and whether a wired LAN cable is connected. If the CPU 154 determines that a wired LAN cable is connected, the wired LAN connection mode can be set for the communication apparatus 151. In contrast, if the CPU 154 determines that no USB cables are connected to the communication apparatus 151 (NO in step S305), the processing proceeds to step S306.

In step S306, the CPU 154 causes the communication apparatus 151 to start operation in the connection setting mode. In other words, the communication apparatus 151 automatically starts operation in the connection setting mode without an operation on the connection setting mode region 203 or the connection setting mode button 211 after the power button is pressed.

At this time, the CPU 154 can display a screen indicating the state that the connection setting mode is started on the operation display unit 160.

In step S307, the CPU 154 starts timer measurement to measure (count) the connection setting mode elapsed time and waits for transmission of the settings information from the information processing apparatus 101. According to the present exemplary embodiment, the value counted in the timer measurement is a value in minutes that is incremented every time one minute passes, but this is not a limiting form. For example, the value can be a value in seconds that is incremented every time one second passes.

In step S308, the CPU 154 determines whether the settings information is received from the information processing apparatus 101.

If the CPU 154 determines that the settings information is received from the information processing apparatus 101 (YES in step S308), the processing proceeds to step S309. In step S309, the CPU 154 ends the operation of the communication apparatus 151 in the connection setting mode, and then in step S310, the CPU 154 stops the timer measurement. If the connection setting mode is ended in a state where a connection between the information processing apparatus 101 and the communication apparatus 151 is established via the dedicated AP for the connection setting mode, the connection between the information processing apparatus 101 and the communication apparatus 151 is disconnected. In step S311, the CPU 154 performs the connection setting process for the communication apparatus 151 based on the received settings information. Specifically, the CPU 154 sets a connection mode based on the received settings information. Details of the connection setting process of the communication apparatus 151 will now be described.

In a case where information (AP information) corresponding to the infrastructure connection mode is received as the settings information, the CPU 154 registers the AP corresponding to the settings information as an AP for use in the infrastructure connection mode in the RAM 153 through the connection setting process, and establishes a connection between the AP and the communication apparatus 151. If an encryption key is needed to use the AP, the CPU 154 registers the encryption key. After the AP is appropriately registered and a connection is established, the CPU 154 sets the communication apparatus 151 to the infrastructure connection mode in which communication via the registered AP can be performed. The communication apparatus 151 thereby operates in a state of being wirelessly connectable to the information processing apparatus 101 via the registered AP. If information corresponding to the WFD mode or the software AP mode is received as the settings information, the CPU 154 transmits connection information for connecting to an AP supporting the WFD mode or the software AP mode to the information processing apparatus 101 before ending the connection setting mode of the communication apparatus 151. Thus, if the information corresponding to the WFD mode or the software AP mode is received as the settings information, the CPU 154 ends the connection setting mode and thereafter performs the connection setting process to enable the AP supporting the WFD mode or the software AP mode, and sets the communication apparatus 151 to the WFD mode or the software AP mode. In this state, if a connection request including the connection information transmitted before the connection setting mode is ended is received from the information processing apparatus 101 from which the settings information is transmitted, the CPU 154 establishes a connection between the communication apparatus 151 and the information processing apparatus 101 using the P2P method. The communication apparatus 151 thereby operates in a state of being wirelessly connectable to the information processing apparatus 101 using the P2P method. After the connection setting process is completed, the processing proceeds to step S317.

Details of the connection setting process are not limited to those described above. For example, only the infrastructure connection mode can be set while the direct connection mode is not set depending on the settings information received from the information processing apparatus 101. If, for example, information (AP information) corresponding to the infrastructure connection mode is received as the settings information, the communication apparatus 151 can be set to not only the infrastructure connection mode but also the WFD mode or the software AP mode simultaneously.

In contrast, if the CPU 154 determines that no settings information is received from the information processing apparatus 101 (NO in step S308), the processing proceeds to step S312. In step S312, the CPU 154 determines whether a USB cable is connected to the communication apparatus 151. This determination is performed because there are cases where the user connects a USB cable to the communication apparatus 151 to use the communication apparatus 151 via USB communication after the communication apparatus 151 starts operation in the connection setting mode. Details of the process of step S312 are similar to those of step S305. If the CPU 154 determines that a USB cable is connected to the communication apparatus 151 (YES in step S312), the processing proceeds to step S315. In step S315. the CPU 154 ends the operation of the communication apparatus 151 in the connection setting mode. In step S316, the CPU 154 stops the timer measurement. Thereafter, the processing proceeds to step S317.

In contrast, if the CPU 154 determines that no USB cables are connected to the communication apparatus 151 (NO in step S312), the processing proceeds to step S313. In step S313, the CPU 154 determines whether the connection setting mode elapsed time measured in the timer measurement has exceeded the timeout time. The timeout time before the timeout time is changed by a timeout time changing process described below is 60 minutes according to the present exemplary embodiment, this is not a limiting form, and any values can be used. If the CPU 154 determines that the connection setting mode elapsed time measured in the timer measurement has exceeded the timeout time (YES in step S313), the processing proceeds to step S315. If the CPU 154 determines that the connection setting mode elapsed time measured in the timer measurement has not exceeded the timeout time (NO in step S313), the processing proceeds to step S314.

In step S314, the CPU 154 determines whether the initial setting process is completed. The completion of the initial setting process is as described above with reference to FIG. 4. If the CPU 154 determines that the initial setting process is not completed (NO in step S314), the processing proceeds to step S308 and the CPU 154 waits for transmission of the settings information from the information processing apparatus 101. In contrast, if the CPU 154 determines that the initial setting process is completed (YES in step S314), the processing proceeds to step S318.

In step S317, as in step S314, the CPU 154 determines whether the initial setting process is completed. If the CPU 154 determines that the initial setting process is not completed (NO in step S317), the processing proceeds to step S317 again and the CPU 154 waits until the initial setting process is completed. In contrast, if the CPU 154 determines that the initial setting process is completed (YES in step S317), the processing proceeds to step S318.

In step S318, the CPU 154 determines whether the communication apparatus 151 is operating in the connection setting mode. If the CPU 154 determines that the communication apparatus 151 is operating in the connection setting mode (YES in step S318), the processing proceeds to step S319. If the CPU 154 determines that the communication apparatus 151 is not operating in the connection setting mode (NO in step S318), the processing proceeds to step S324. The case where the CPU 154 determines that the communication apparatus 151 is operating in the connection setting mode (YES in step S318) is a case where the initial setting process is completed without timing out the connection setting mode (YES in step S314). Examples of the case where the CPU 154 determines that the communication apparatus 151 is not operating in the connection setting mode (NO in step S318) include a case where the initial setting process is completed after the connection setting mode is timed out and a case where the initial setting process is completed without starting the operation in the connection setting mode (YES in step S317).

In step S319, the CPU 151 determines whether the connection setting mode elapsed time measured in the timer measurement is short. In other words, this process is a process of determining whether the remaining time before the connection setting mode is timed out and ended is long. Specifically, the CPU 154 determine whether a value calculated by subtracting the connection setting mode elapsed time from the timeout time is less than a predetermined threshold value. The predetermined threshold value used in the determination is 15 minutes according to the present exemplary embodiment, but this is not a limiting form, and any values can be used. The determination can determine, for example, whether the connection setting mode elapsed time is greater than a threshold value. If the CPU 154 determines that the connection setting mode elapsed time measured in the timer measurement is short (YES in step S319), a sufficient time remains before the connection setting mode is timed out and ended, and therefore the processing proceeds to step S321 without changing the timeout time and the connection setting mode elapsed time by the CPU 154.

In contrast, if the CPU 154 determines that the connection setting mode elapsed time measured in the timer measurement is not short (NO in step S319), the remaining time before the connection setting mode is timed out and ended is not long, and thus the processing proceeds to step S320. In step S320, the CPU 154 performs a process of changing the timeout time. Specifically, this process is, for example, a process of changing the timeout time so that the value calculated by subtracting the connection setting mode elapsed time from the timeout time becomes a predetermined value. The predetermined value is set to, but not limited to, for example, 15 minutes, and any values can be used. Specifically, in this form, if, for example, the timeout time is 60 minutes and the connection setting mode elapsed time is 50 minutes, the timeout time is changed to 65 minutes. Further, the process can be, for example, a process of changing the timeout time to be greater than the timeout time before not based on the connection setting mode elapsed time. At this time, for example, a value is added to the timeout time, and the added value can be a predetermined value or can be a value that varies depending on the connection setting mode elapsed time. The process can be any process of controlling the remaining time before the connection setting mode is timed out and ended to become long. Thus, for example, the process is not limited to a process of changing the timeout time and can be a process of changing the connection setting mode elapsed time to increase the remaining time before the connection setting mode is timed out and ended. Specifically, for example, the connection setting mode elapsed time can be changed so that the value calculated by subtracting the connection setting mode elapsed time from the timeout time becomes the predetermined value. Specifically, in this form, if the timeout time is 60 minutes and the connection setting mode elapsed time is 50 minutes, the connection setting mode elapsed time is changed to 45 minutes. Further, for example, the process can be a process of changing the connection setting mode elapsed time not based on the timeout time so that the changed connection setting mode elapsed time is less than the connection setting mode elapsed time before the change. At this time, for example, a value is subtracted from the connection setting mode elapsed time, and the subtracted value can be a predetermined value or can be a value that varies depending on the connection setting mode elapsed time. Further, for example, the process can be a process of resetting the connection setting mode elapsed time (setting the connection setting mode elapsed time to zero). Further, for example, both the timeout time and the connection setting mode elapsed time can be changed. Specifically, in this form, for example, if the timeout time is 60 minutes and the connection setting mode elapsed time is 50 minutes, the connection setting mode elapsed time is reset, and the timeout time is changed to 15 minutes. In the form where both the timeout time and the connection setting mode elapsed time are changed as described above, the timeout time can be changed so that the changed timeout time is less than the value before the change. Thereafter, the processing proceeds to step S321.

In step S324 that is performed if the CPU 154 determines that it is not the initial setting time (NO in step S302) or if the CPU 154 determines that the communication apparatus 151 is not operating in the connection setting mode (NO in step S318), the CPU 154 determines whether a connection mode is set for the communication apparatus 151. Details of step S324 are similar to those of step S304. If the CPU 154 determines that a connection mode is set for the communication apparatus 151 (YES in step S324), the CPU 154 ends the process in the flowchart without causing the communication apparatus 151 to start operation in the connection setting mode. In contrast, if the CPU 154 determines that no connection modes are set for the communication apparatus 151 (NO in step S324), the processing proceeds to step S325.

In step S325, the CPU 154 determines whether a USB cable is connected to the communication apparatus 151. Details of step S325 are similar to those of step S305. If the CPU 154 determines that a USB cable is connected to the communication apparatus 151 (YES in step S325), the CPU 154 ends the process in the flowchart without causing the communication apparatus 151 to start operation in the connection setting mode. In contrast, if the CPU 154 determines that no USB cables are connected to the communication apparatus 151 (NO in step S325), the processing proceeds to step S326.

In step S326, the CPU 154 causes the communication apparatus 151 to start operation in the connection setting mode. Details of step S326 are similar to those of step S306.

In step S327, the CPU 154 starts the timer measurement to measure the connection setting mode elapsed time and waits for transmission of the settings information from the information processing apparatus 101. Details of step S327 are similar to those of step S307. Thereafter, the processing proceeds to step S321.

In step S321, the CPU 151 determines whether the settings information is received from the information processing apparatus 101. If the CPU 154 determines that the settings information is received from the information processing apparatus 101 (YES in step S321), the processing proceeds to step S328. If the CPU 154 determines that no settings information is received from the information processing apparatus 101 (NO in step S321), the processing proceeds to step S322.

Details of steps S328 to S330 are similar to those of steps S309 to S311. After step S330, the CPU 154 ends the process in the flowchart.

In step S322, the CPU 154 determines whether a USB cable is connected to the communication apparatus 151. Details of step S322 are similar to those of step S312. If the CPU 154 determines that a USB cable is connected to the communication apparatus 151 (YES in step S322), the processing proceeds to step S331. If the CPU 154 determines that no USB cables are connected to the communication apparatus 151 (NO in step S322), the processing proceeds to step S323.

In step S323, the CPU 151 determines whether the connection setting mode elapsed time measured in the timer measurement has exceeded the timeout time. At this time, if the timeout time has been changed in step S320, the determination is performed based on the changed timeout time. If the CPU 154 determines that the connection setting mode elapsed time measured in the timer measurement has exceeded the timeout time (YES in step S323), the processing proceeds to step S331. If the CPU 154 determines that the connection setting mode elapsed time measured in the timer measurement has not exceeded the timeout time (NO in step S323), the processing returns to step S321.

Details of steps S331 and S332 are similar to those of steps S315 and S316. After step S332, the CPU 154 ends the process in the flowchart.

As described above, according to the present exemplary embodiment, the timeout time is extended if the remaining time before the operation in the connection setting mode ends after the completion of the initial setting process is short (NO in step S319) as a result of taking time to complete the initial setting process. This allows enough time for the user to establish a connection between the information processing apparatus 101 and the communication apparatus 151 and to set a connection mode for the communication apparatus 151. According to the present exemplary embodiment, the timeout time is not changed if, for example, the remaining time before the operation in the connection setting mode ends after the completion of the initial setting process is long (YES in step S319). Further, the timeout time is also not changed if, for example, the connection setting mode is started without starting the initial setting process (in a case where step S326 is performed after the CPU 154 determines that it is not the initial setting time (NO in step S302)). This prevents the connection setting mode from continuing excessively long and ensures a secure connection of the communication apparatus 151.

FIG. 5 is a flowchart illustrating a process that is performed by the information processing apparatus 101 to cause the communication apparatus 151 to perform the connection setting process. The flowchart is realized by the CPU 103 by loading a control program for the flowchart stored in the ROM 104 or an external storage device (not illustrated) to the RAM 105 and executing the loaded control program.

In step S501, the CPU 103 receives a user operation and activates a wireless LAN setting application. The wireless LAN setting application is an application for setting a connection mode for the communication apparatus 151. The wireless LAN setting application can include another function, such as a function of transmitting a print job to the communication apparatus 151 to cause the communication apparatus 151 to perform printing. The wireless LAN setting application is a program stored in an internal storage device (not illustrated) of the information processing apparatus 101 and is installed in advance in the information processing apparatus 101 by the user. The connection mode setting process described below is realized by the CPU 103 by executing the wireless LAN setting application.

An example will be described below of setting the communication apparatus 151 to the infrastructure connection mode by the wireless LAN setting application by registering an AP for use in the infrastructure connection mode in the communication apparatus 151. The AP registration can be performed using a service on the Internet via a web browser or using another function of the information processing apparatus 101 and the communication apparatus 151 without using the wireless LAN setting application. Further, at this time, the CPU 103 temporarily stores in the RAM 105 AP information about the AP to which the information processing apparatus 101 is connected.

In step S502, the CPU 103 searches for an AP to which the information processing apparatus 101 can access via the communication unit 109. The AP search can be performed automatically at the time of activation of the wireless LAN setting application or can be performed in response to an instruction from the user. The AP search is performed by receiving beacons transmitted from APs by the communication unit 109.

In step S503, the CPU 103 displays a list of APs (AP search result) detected through the AP search in step S502 on the operation display unit 108. At this time, the CPU 103 displays, for example, a list of SSIDs of the APs. In step S503, the CPU 103 can automatically extract APs having a SSID in a format that conforms to the above-described rule of the SSID of the dedicated AP for the connection setting mode and can display the extracted APs. At this time, if there is a plurality of SSIDs in a format that conforms to the above-described rule, the plurality of SSIDs is displayed to prompt the user to select a SSID from the displayed SSIDs. If this configuration is used, step S505 described below can be skipped.

When the APs are displayed in step S503, the user selects an AP corresponding to the connection mode setting target communication apparatus from the search result.

In step S504, the CPU 103 detects reception of the AP selected by the user.

In step S505, the CPU 103 determines whether the AP selected in step S504 corresponds to a communication apparatus that is a setting target of the wireless LAN setting application. Specifically, the CPU 103 determines whether the selected AP is an AP having a SSID in a format that conforms to the above-described rule of the SSID of the dedicated AP for the connection setting mode. If the CPU 103 determines that the selected AP is not an AP in the setting target communication apparatus, the CPU 103 waits for detection of another AP selected by the user. At this time, the CPU 103 can display a screen on the operation display unit 108 to notify the user that the selected AP is inappropriate. The CPU 103 can also end the process if there are no APs corresponding to the setting target communication apparatus or there are no APs in a communication apparatus intended by the user.

As described above, steps S503 to S505 prompt the user to manually select an AP of a communication apparatus that is a connection mode setting target. However, this is not a limiting form. For example, the CPU 103 can automatically select an AP having a SSID in a format that conforms to the above-described rule as an AP of a communication apparatus that is a connection mode setting target from the APs detected through the search in step S502.

If a setting target communication apparatus is selected in step S505, the CPU 103 exchanges a parameter (connection information) for establishing a wireless connection between the information processing apparatus 101 and the communication apparatus 151. The connection information for connecting to the dedicated AP for the connection setting mode is stored in advance by the wireless LAN setting application so that the information processing apparatus 101 connects to the dedicated AP for the connection setting mode and communicates with the communication apparatus 151.

In step S506, the CPU 103 transmits the AP information stored temporarily in the RAM 105 in step S501 as the settings information to the communication apparatus 151 via the dedicated AP for the connection setting mode that is connected in step S505. Receiving the AP information, the communication apparatus 151 is set to the infrastructure connection mode in which a connection can be established via an AP based on the AP information.

In step S507, the CPU 103 terminates the connection to the dedicated AP for the connection setting mode and reconnects to the AP based on the AP information stored temporarily in the RAM 105 in step S501 so that the CPU 103 can communicate with the communication apparatus 151 via the reconnected AP. At this time, the CPU 103 registers the communication apparatus 151 in the RAM 105 as a communication apparatus to which the information processing apparatus 101 will connect. Thereafter, the CPU 103 ends the wireless LAN setting application.

Steps S502 to S504 are not always necessarily performed by the wireless LAN setting application. Another application installed in the information processing apparatus 101 can search for the dedicated AP for the connection setting mode, and the wireless LAN setting application can acquire a result of the search.

Since the CPU 103 communicates with the communication apparatus 151 via the dedicated AP for the connection setting mode, the CPU 103 transmits the settings information to the communication apparatus 151 using the IEEE 802.11 series communication standards (i.e., Wi-Fi). This is not a limiting form, and the CPU 103 can transmit the settings information to the communication apparatus 151 using, for example, a communication standard different from the IEEE 802.11 series communication standard. Examples of a communication standard that can be used at this time are Bluetooth Classic, Bluetooth Low Energy, Near Field Communication, and Wi-Fi Aware®. With this form, the CPU 103 can transmit the settings information to the communication apparatus 151 using another communication standard while maintaining the Wi-Fi connection to the AP for use in the infrastructure connection mode.

In the above description, the CPU 103 sets the infrastructure connection mode for the communication apparatus 151, but this is not a limiting form. For example, another connection mode, such as the WFD mode or the software AP mode, can be set for the communication apparatus 151. A connection mode to be set for the communication apparatus 151 can be determined by, for example, receiving user selection via a screen displayed by the wireless LAN setting application or can be determined automatically by the wireless LAN setting application based on a communication environment of the information processing apparatus 101. For example, when the information processing apparatus 101 is connected to an AP in setting a connection mode for the communication apparatus 151 the infrastructure connection mode is selected as a connection mode to be set for the communication apparatus 151. When, for example, the information processing apparatus 101 is connected to no APs in setting a connection mode for the communication apparatus 151, a P2P method connection mode. such as the WFD mode or the software AP mode, is selected as a connection mode to be set for the communication apparatus 151.

With the above-described configuration, the timeout time of the connection setting mode is set in a case where the user is to perform the connection setting for the communication apparatus 151 using the information processing apparatus 101. This improves usability because the user has more opportunities to change the connection setting with ease.

As described above, according to the present exemplary embodiment, the communication apparatus 151 can start operation in the connection setting mode under various conditions. Specifically, for example, the communication apparatus 151 starts operation in the connection setting mode in step S306 based on a condition (condition 1) that the communication apparatus 151 is shifted to the software-on state and the initial setting is not completed. Further, for example, the communication apparatus 151 starts operation in the connection setting mode in step S326 based on a condition (condition 2) that the communication apparatus 151 is shifted to the software-on state and the initial setting is completed. Further, for example, the communication apparatus 151 starts operation in the connection setting mode based on a condition (condition 3) that the communication apparatus 151 receives a predetermined operation (an operation on the connection setting mode region 203 or the connection setting mode button 211) for starting the connection setting mode. Further, for example, the communication apparatus 151 starts operation in the connection setting mode based on a condition (condition 4) that the communication apparatus 151 receives a reset operation. Further, for example, the communication apparatus 151 starts operation in the connection setting mode based on a condition (condition 5) that the initial setting process is completed after the connection setting mode started based on the condition 1 is timed out and stopped. Thus, the communication apparatus 151 can change the timeout time based on the condition on which the operation in the connection setting mode is started. According to the present exemplary embodiment, the timeout time of the connection setting mode started based on the condition 1 before the change is longer than those of the connection setting modes started based on the other conditions. For example, the timeout time of the connection setting mode started based on the condition 1 before the change is set to 60 minutes while the timeout time of the connection setting mode started based on the other conditions is set to 15 minutes. Alternatively, the same timeout time can be set for all the conditions for starting the operation in the connection setting mode. According to the present exemplary embodiment, the timeout time of the connection setting mode started based on the condition 1 may be changed by the timeout time changing process whereas the timeout time of the connection setting mode started based on the other conditions is not changed. The operation in the connection setting mode does not have to be started in all of the above-described cases, and the above-described conditions can include a condition based on which the operation in the connection setting mode is not started. As described above, according to the present exemplary embodiment, the process of selecting whether to cause the communication apparatus 151 to operate in the connection setting mode based on whether a USB cable or a wired LAN cable is connected is performed. For example, while the process of selecting is performed in the connection setting modes started based on the conditions 1, 2, 4, and 5, the process of selecting may not be performed in the connection setting mode started based on the condition 3 and the communication apparatus 151 can always operate in the connection setting mode when a predetermined operation for starting the connection setting mode is performed.

The above-described exemplary embodiments can also be realized by performing the following process. Specifically, software (program) for realizing the functions of the above-described exemplary embodiments is supplied to a system or an apparatus via a network or various storage mediums, and a computer (a CPU or a micro-processing unit (MPU)) of the system or the apparatus reads the program and executes the read program. Further, the program can be executed by a single computer or by a plurality of computers cooperating together. Further, not the entire process described above has to be realized by software, and the process can be realized partially or entirely by hardware such as an application-specific integrated circuit (ASIC). Further, the CPU is not limited to a single CPU configured to perform the entire process, and a plurality of CPUs can perform the process by cooperating with each other as needed.

(Other Embodiments)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-108168, filed Jun. 29, 2021, which is hereby incorporated by reference herein in its entirety.

What is claimed is:

1. A communication apparatus comprising:
a start unit configured to cause the communication apparatus to start operation in a connection setting mode to receive settings information from an information processing apparatus;
a setting unit configured to perform connection setting of the communication apparatus based on the settings information in a case where the settings information is received from the information processing apparatus while the communication apparatus is operating in the connection setting mode;
a performing unit configured to perform a predetermined process conducted based on a user operation; and
a control unit configured to perform
in a case where the communication apparatus is operating in the connection setting mode and the predetermined process is not completed, first control to stop the operation in the connection setting mode based on passage of a first time without performance of the connection setting from the start of the operation of the communication apparatus in the connection setting mode, and
in a case where the communication apparatus is operating in the connection setting mode and the predetermined process is completed, second control to stop the operation in the connection setting mode based on passage of a second time longer than the first time without performance of the connection setting from the start of the operation of the communication apparatus in the connection setting mode.

2. The communication apparatus according to claim 1, further comprising:
a count unit configured to count a value corresponding to a time from the start of the operation of the communication apparatus in the connection setting mode; and
a determination unit configure to determine whether to stop the operation in the connection setting mode based on the counted value and a predetermined threshold value,
wherein the first control includes a process of determining whether to stop the operation in the connection setting mode based on the counted value and the predetermined threshold value corresponding to the first time, and
wherein the second control includes a change process including at least one of changing to decrease the counted value and changing to increase the predetermined threshold value and includes a process of determining whether to stop the operation in the connection setting mode based on the counted value and the predetermined threshold value after the change process.

3. The communication apparatus according to claim 2, wherein whether to perform the first control or the second control is controlled based on the time from the start of the operation of the communication apparatus in the connection setting mode in a case where the predetermined process is completed while the communication apparatus is operating in the connection setting mode.

4. The communication apparatus according to claim 3, wherein the control is performed such that the first control is performed in a case where the predetermined process is completed while the communication apparatus is operating in the connection setting mode and the time from the start of the operation of the communication apparatus in the connection setting mode is not greater than a specific threshold value, and
wherein the second control is performed in a case where the predetermined process is completed while the communication apparatus is operating in the connection setting mode and the time from the start of the operation of the communication apparatus in the connection setting mode is greater than the specific threshold value.

5. The communication apparatus according to claim 2, wherein the counted value and the predetermined threshold value are both changed in the change process.

6. The communication apparatus according to claim 5, wherein the changing to decrease the counted value and changing to decrease the predetermined threshold value are performed.

7. The communication apparatus according to claim 1, wherein the communication apparatus is caused to start operation in the connection setting mode based on a press of a power button of the communication apparatus without completion of the predetermined process of the communication apparatus.

8. The communication apparatus according to claim 7, wherein the communication apparatus is caused to start operation in the connection setting mode based on the press of the power button of the communication apparatus without completion of the predetermined process of the communication apparatus and based on absence of a connection of a universal serial bus (USB) cable to the communication apparatus, and
wherein in a case where the power button of the communication apparatus is pressed without completion of the predetermined process of the communication apparatus and a USB cable is connected to the communication apparatus, the communication apparatus is not caused to start operation in the connection setting mode.

9. The communication apparatus according to claim 7, wherein in a case where the operation in the connection setting mode is started based on another condition different from the press of the power button of the communication apparatus without completion of the predetermined process of the communication apparatus, third control is performed to stop the operation in the connection setting mode based on passage of a third time different from the first time and the second time without performance of the connection setting from the start of the operation of the communication apparatus in the connection setting mode.

10. The communication apparatus according to claim 9, wherein the oilier condition includes the press of the power button of the communication apparatus with completion of the predetermined process of the communication apparatus.

11. The communication apparatus according to claim 9, wherein the other condition includes performance of a predetermined operation on the communication apparatus, the predetermined operation being an operation for starting the operation in the connection setting mode and being different from the press of the power button.

12. The communication apparatus according to claim 9, wherein the other condition includes completion of the predetermined process after the operation in the connection setting mode is stopped based on the passage of the first time without performance of the connection setting from the start of the operation of the communication apparatus in the connection setting mode.

13. The communication apparatus according to claim 1, wherein the operation in the connection setting mode is stopped in a case where the connection setting of the communication apparatus is performed.

14. The communication apparatus according to claim 1, wherein the predetermined process is an initial setting process of performing an initial setting of the communication apparatus.

15. The communication apparatus according to claim 14, wherein the initial setting process includes a process of cleaning a component of the communication apparatus.

16. The communication apparatus according to claim 1, wherein the connection setting of the communication apparatus includes a process of connecting the communication apparatus to an access point outside the communication apparatus and the information processing apparatus.

17. The communication apparatus according to claim 1, wherein the connection setting mode is a mode in which a predetermined access point of the communication apparatus is enabled.

18. The communication apparatus according to claim 1, further comprising a printing unit configured to perform printing.

19. A method for controlling a communication apparatus, the method comprising:

causing the communication apparatus to start operation in a connection setting mode to receive settings information from an information processing apparatus;

performing connection setting of the communication apparatus based on the settings information in a case where the settings information is received from the information processing apparatus while the communication apparatus is operating in the connection setting mode;

performing a predetermined process conducted based on a user operation; and performing in a case where the communication apparatus is operating in the connection setting mode and the predetermined process is not completed, first control to stop the operation in the connection setting mode based on passage of a first time without performance of the connection setting from the start of the operation of the communication apparatus in the connection setting mode, and in a case where the communication apparatus is operating in the connection setting mode and the predetermined process is completed, second control to stop the operation in the connection setting mode based on passage of a second time longer than the first time without performance of the connection setting from the start of the operation of the communication apparatus in the connection setting mode.

* * * * *